Feb. 18, 1964 — C. S. EVANS — 3,121,274
SAFETY HOOK
Filed June 16, 1961
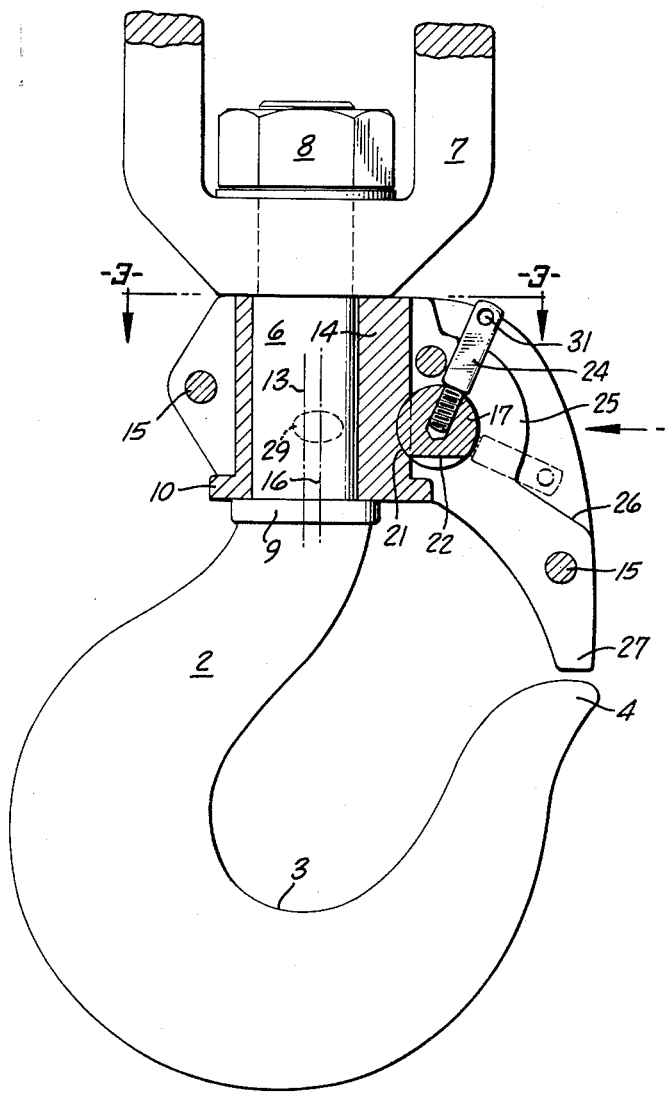
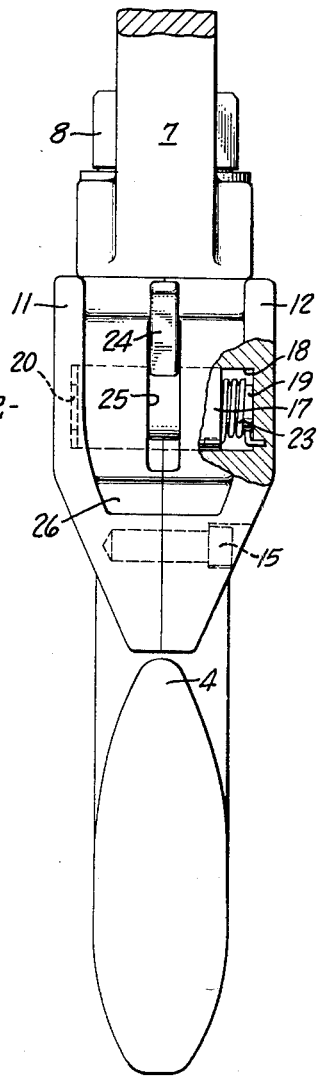
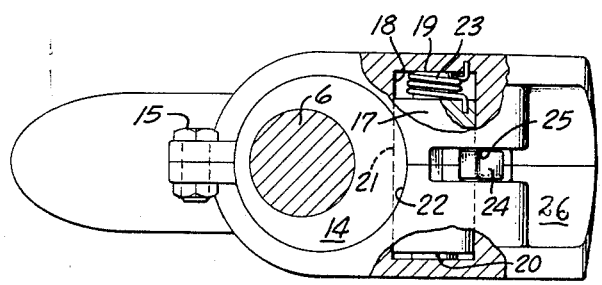
INVENTOR.
Charles S. Evans

United States Patent Office 3,121,274
Patented Feb. 18, 1964

3,121,274
SAFETY HOOK
Charles S. Evans, 124 Isabella Ave., Atherton, Calif.
Filed June 16, 1961, Ser. No. 117,584
12 Claims. (Cl. 24—241)

My invention relates to hoisting hooks and the broad purpose of my invention is the provision of an improved safety gate for preventing accidental release of the load, and accidental or unintended catching of the hook in extraneous objects or structure.

Other objects of the invention include the provision of:

A safety gate movable to closed or open position manually or by a jerk line from a remote point.

A safety gate which closes from open position and locks automatically.

A safety gate which is secure against accidental opening because of collision with some other object.

A safety gate of rugged simple construction, with costs of manufacture and assembly in the low range.

Other objects will be set forth in the following description of the invention which is illustrated in the accompanying drawings. It is understood that I do not limit myself to the embodiment of my invention shown in the said description and drawings, as I may adopt other embodiments within the scope of my invention as set forth in the claims.

Some of the advantages of the invention reside in its simplicity of construction, in its convenient and dependable operation, and in its adaptability for use with a wide variety of sizes and types of hoisting hooks.

For illustration I have chosen a number 6 hook of conventional shape having a 1" x 3" shank and 1⅜" throat opening.

In the drawings:

FIG. 1 is a side elevation of one embodiment of my invention. The gate is shown in vertical half section. The upper portion of the conventional bail or shackle is broken away to reduce the length of the figure.

FIG. 2 is an elevation of the hook shown in FIG. 1. The direction in which the view is taken is indicated by the arrow 2 in FIG. 1.

FIG. 3 is a sectional view of the hook shown in FIG. 1. The section is taken in the horizontal plane indicated by the line 3—3 of FIG. 1.

The use of safety gates on hoisting hooks has increased greatly in recent years, not only in accompanying the normal expansion of industry, but because of the steady pressure to provide greater safety to workmen. An open hook swinging on a hoisting line can be a serious menace to workmen and property whether it is empty or loaded. Besides an accidental release of its load, an open hook may be snagged in running gear and rigging or even in stationary parts of building or ship in spite of skilled handling by the hoist or crane operator. Any such mishap may cause injury or death to adjacent workmen in addition to serious property loss.

Ideally then, a hoist hook should include a gate closing the throat with a smooth bridge across the loading opening between the point of the hook and its upper body, from which the supporting shank extends. The gate should be readily shifted into and out of its closed position and should lock automatically in either open or closed position to avoid unguided or accidental movement.

Such shifting of the gate should be responsive to direct and uncomplicated manual control, and also to jerk-line control. The hook should not be capable of accidental opening whether loaded or empty, because of collision with fixed or stationary structures.

My safety hook comprises a main body 2 which curves around in the bight 3 to end in a point 4, spaced from the upper end of the body to form a throat through which the bail or cable ties supporting the load must pass to reach the bight.

Extending upwardly from the body 2 is a cylindrical shank 6 on the end of which a ball or shackle 7 is secured by a nut 8, threaded on the shank over a bearing washer. The upper end of the body 2 is formed with a flange 9, and that portion of the shank lying between the flange and the bail base provides the mounting for the gate formed of parts 11 and 12.

The cylindrical shank in its usual or standard proportions is of convenient diameter to serve as a bearing about which the gate may swing; and that is the preferred structure for most embodiments of my invention. There are occasions however when with the same overall length of shank, a larger diameter of bearing for the gate becomes practically desirable, and indeed offers certain desirable qualities.

With the operating mechanism of FIG. 1 embodiment, the standard shank provides insufficient room below the conventional bail, especially with a gloved hand, for the facile operation desired. Increasing the length of the shank or increasing its diameter, gives the additional operating space required for fast and easy control. While the choice between a lengthened shank and one of increased diameter lies chiefly in the matter of cost, the increased diameter shank, besides greater convenience in use, gives two substantial physical advantages over the standard 3" length x 1" diameter shank of the #6 hook. The cross sectional area of the standard shank and therefore the strength of the shank is not lessened by the locking recess, and the locking leverage measured outwardly from the shank axis 13 is substantially increased, thus lessening applied stresses and wear. These advantages are believed to fully justify the larger shank diameter while retaining the shorter or standard length in the embodiment illustrated in FIGS. 1, 2 and 3.

In FIGS. 1, 2 and 3 such an enlarged bearing is obtained by an eccentric flanged sleeve 14 press fitted or shrunk on the shank 6, with the eccentric bulge in alignment with the point 4. It is obvious that instead of applying a sleeve, the original hook forging may provide the enlarged bearing portion of the shank. The choice is largely a question of convenience in manufacture and cost without other practical significance. For that reason the word "shank" as used herein refers to both the one-piece forging, and the standard shank enlarged by application of a sleeve.

Journalled on the shank bearing against the flange 10 is the gate 11—12 preferably, in this embodiment, made in two congruous halves held together by screws 15. The gate swings freely about the shank axis 13 if the standard shank 6 is used, but with the enlarged shank, the journal axis 16 lies a short distance forward of axis 13 as shown. The gate halves are assembled over a locking roll 17, journalled as shown in FIGS. 2 and 3, in aligned bearings or bores 18 in each half of the gate. The ends 19 and 20 of the roll preferably are reduced in diameter and bear lightly against the ends of the bearings to reduce friction when the roll is turned.

Both roll and shank have cylindrical recesses in the sides thereof complementary to each other. The recess 21 in the shank is coincident with the cylindrical surface of the roll, and when the roll occupies it, as shown in FIG. 1, the gate is securely locked across the throat of the hook. The recess 22 in the roll is preferably coincident with the cylindrical surface of the shank, and when the roll is turned about 90° from its position in FIG. 1, the gate is unlocked and free to be swung in either direction about its bearing on the shank having the axis 16. True coincidence is not necessary to operation, but is preferred for larger stress-bearing surfaces and longer wear. Of course a working clearance is necessary.

Means are provided for rotating the locking roll through about 90° of arc. On the reduced end 19 of the roll, a coil spring 23 is arranged as shown, one end anchored in the roll and the other end anchored in the body of the gate, so that the roll is spring-pressed in a counterclock rotation to seat the cylindrical portion of the roll in the shank recess 21. The roll is stopped in the locking position by an operator lever 24, threaded into a hole in the roll and extending radially therefrom and through a slot 25 formed between the two halves of the gate. Opposite sides of the lever are flat and bear against the sides 25 of the slot, so that it cannot unscrew from the roll.

To protect the operating lever from accidental engagement when the hook is swinging free, the curved face of the gate on each side of the lever is dished as shown, so that a workman, perhaps with heavy gloves on his hands, can readily find a comfortable finger hold behind the exposed lever end to pull the lever through an arc of about 90° to the stop 26, formed by the lower end of the slot and dished surface. In this position the recess 22 in the roll registers with the cylindrical surface of the shank so that the gate is free to turn in either direction about the shank. The lever may be released as soon as the gate has been turned through but a few degrees, the edge of the recess 22 riding on the shank, until the gate is returned to bridging position with the end 27 aligned with the hook point 4, whereupon the roll snaps back into locking engagement with the shank, the lever 24 stopped against the upper end of the slot 25.

A small and shallow cylindrical recess 29 in the shank on each side provides a temporary or half lock to hold the gate in the open position. The lever 24 is provided with a hole 31 at its free end for attachment of a jerk line, by manipulation of which the gate may be unlocked, swung to either side to a half-lock in a recess 29, then unlocked and returned to bridging position and allowed to lock there automatically by release of the line.

I claim:

1. A hoisting hook having a cylindrical shank, a hook body connected to the shank and having an open throat, a gate journaled about the shank to close or open the throat, said shank having a recess with a cylindrical surface extending laterally across a side thereof, a cylindrical locking roll rotatably journaled for rotary movement only in the gate and extending laterally into said shank recess to lock the gate across the throat, said roll having a recess in a side thereof to release the gate from said shank when rotary movement only of the roll aligns the roll recess with the shank recess, and means for selectively rotating the roll to lock the gate on the shank or release it therefrom.

2. A hoisting hook in accordance with claim 1 in which spring means urges rotation of the roll to engage it in the shank recess, and wherein said means include a manually operable member to rotate the roll to release it from the shank.

3. A hoisting hook in accordance with claim 1 in which said means comprises a spring interposed between the gate and the roll to rotate the roll in one direction, and a manually operable member connected to the roll to rotate it in the other direction.

4. A hoisting hook in accordance with claim 1 in which the body of the gate comprises two congruous vertically divided parts with means for securing them rigidly together.

5. A hoisting hook in accordance with claim 4 in which said means comprises a lever connected to the roll and extending from the body parts rotates the roll in one direction to unlock the gate, and a spring interposed between the roll and the gate tends to rotate the roll in the opposite direction to lock the gate.

6. A hoisting hook having a cylindrical shank, a hook body connected to the shank and having an open throat, a gate journaled about the shank to close or open the throat, a cylindrical locking roll rotatably journaled in the gate and intersecting the shank, each said roll and shank having in a side thereof a cylindrical recess complementary to the cylindrical shape of the other, spring means interposed between the roll and the gate and urging rotation of the roll to engage in the shank recess, and means for rotating the roll against the spring means to align the cylindrical recess in the roll with the cylindrical surface of the shank whereby said gate is free to rotate to open said throat.

7. A hoisting hook having a cylindrical shank, a hook body connected to the shank and having an open throat, a gate journaled about the shank to close or open the throat, a cylindrical locking roll rotatably journaled in the gate for rotary movement only and intersecting the shank, each said roll and shank having in a side thereof a cylindrical recess complementary to the cylindrical shape of the other, and means for selectively rotating the roll to engage its cylindrical body within the shank recess or to align its cylindrical recess with the cylindrical surface of the shank whereby said gate is free to rotate to open said throat.

8. A hoisting device comprising a curved main body having an axis and providing an open throat and a cylindrical shank connected to said body and extending therefrom and having an axis spaced in the direction toward said open throat from and parallel to said curved body axis in the plane of said curved body, a gate journaled about the shank to close or open said body throat, said shank having a recess with a cylindrical surface extending laterally across a side thereof, a cylindrical locking roll rotatably journaled for rotation only in the gate and extending laterally into said shank recess to lock the gate across the throat, said roll having a recess in a side thereof to release the gate from said shank when rotary movement only of the roll aligns the roll recess with the shank recess, and means for selectively rotating the roll to lock the gate on the shank or release it therefrom.

9. A hoisting hook in accordance with claim 8 in which said means comprises a spring interposed between the gate and the roll to rotate the roll in one direction, and manually operable means is connected to the roll to rotate it in the other direction.

10. A hoisting device comprising a curved main body having an axis and providing an open throat and a cylindrical shank connected to said body and extending therefrom and having an axis spaced from and parallel to said curved body axis in the plane of said curved body, a gate journaled about the shank to close or open the throat, a cylindrical locking roll rotatably journaled in the gate and intersecting the shank, each said roll and shank having in a side thereof a cylindrical recess complementary to the cylindrical shape of the other, spring means interposed between the roll and the gate and urging rotation of the roll to engage lockingly in the shank recess, and means for rotating the roll against the spring means to align the cylindrical recess in the roll with the cylindrical surface of the shank to release the roll from the shank.

11. A hoisting hook having a shank, a hook body connected to the shank and having an open throat, a gate comprising a pair of congruous halves fixed rigidly together and journaled on the shank, a locking roll having its opposite ends journaled in and wholly enclosed by the congruous halves and retained therebetween, each said roll and shank having in a side thereof a recess in which the other may lie, whereby when the recess in the shank is aligned with the recess in the roll, the gate may be rotated away from the open throat and means intermediate the ends of the locking roll for rotating it to lock the roll to the shank or release it therefrom.

12. A hoisting hook in accordance with claim 11 in which said means includes spring means interposed between the locking roll and the gate urging rotation in one direction.

References Cited in the file of this patent

UNITED STATES PATENTS

| | | |
|---|---|---|
| 761,809 | Anderson | June 7, 1904 |
| 1,433,671 | Bahuzky | Oct. 31, 1922 |
| 1,918,114 | Lorenzen | July 11, 1933 |
| 2,728,967 | Burnham | Jan. 3, 1956 |
| 2,835,013 | Thompson | May 20, 1958 |
| 2,905,997 | Ramskill | Sept. 29, 1959 |